United States Patent [19]

Wilson

[11] Patent Number: 5,476,058
[45] Date of Patent: Dec. 19, 1995

[54] PORTABLE SAIL

[76] Inventor: John A. Wilson, 225 Hendricks Isle, Fort Lauderdale, Fla. 33301

[21] Appl. No.: 253,565

[22] Filed: Jun. 3, 1994

[51] Int. Cl.[6] .................................................. B63H 9/04
[52] U.S. Cl. .................................................. 114/102; 114/89
[58] Field of Search .................................. 114/89, 90, 102, 114/103, 39.1, 39.2, 97, 109, 87; 280/810

[56] References Cited

U.S. PATENT DOCUMENTS

| | | | |
|---|---|---|---|
| 3,889,620 | 6/1975 | Dorland | 114/102 |
| 3,924,870 | 12/1975 | Spivack et al. | 280/810 |
| 4,269,133 | 5/1981 | Brown | 114/103 |
| 4,408,772 | 10/1983 | Höllwarth | 114/354 |
| 4,473,022 | 9/1984 | Eastland | 114/39.2 |
| 4,541,355 | 9/1985 | Denton | 114/39 |
| 4,651,665 | 3/1987 | Drake | 114/102 |
| 4,682,557 | 7/1987 | Magruder et al. | 114/39.2 |
| 4,697,534 | 10/1987 | Kettlestrings | 114/90 |
| 4,712,498 | 12/1987 | Oser | 114/39.2 |
| 4,771,723 | 9/1988 | Friesen | 114/39.2 |
| 4,940,008 | 6/1990 | Hoyt | 114/39.1 |
| 4,978,140 | 12/1990 | Babson | 280/810 |
| 5,197,403 | 3/1993 | Hatlapa | 114/90 |

FOREIGN PATENT DOCUMENTS

| | | | |
|---|---|---|---|
| 2833616 | 2/1980 | Germany | 114/102 |

*Primary Examiner*—Edwin L. Swinehart
*Attorney, Agent, or Firm*—Stevens, Davis, Miller & Mosher

[57] ABSTRACT

A hand held portable sail including a forward spar and a rear spar, said spars being attached near one end of each spar by a lower handle; and a sail material extending between the spars and connected to each of said spars.

9 Claims, 7 Drawing Sheets

PORTABLE SAIL

The present invention relates to an improved sail device. In particular, the present invention relates to a sail device which can be easily carried and is suitable for both land and water use. The device is portable since no mounting is required.

BACKGROUND OF THE INVENTION

Prior to the present invention, it has been necessary for sails to be mounted to a sailboard, small boat or the like before the sails could be used to harness the energy of the wind for motion. Such sails are not suitable for land use by, for example, line-skaters, ice-skaters or skateboarders. Such sails are also not suitable for use as, for example, recreation or emergency propulsion for small motorized vessels, which do not have the necessary structure on which to mount sails.

OBJECTS AND SUMMARY OF THE INVENTION

One object of the present invention is to provide a portable sail which can be used on land by line-skaters, ice-skaters, skateboarders and the like to harness the energy of the wind.

A second object is to provide a portable sail which can be used on water vessels without the need to mount the sail on the vessel.

A third object is to provide a means of powering roller skates, line-skates, ice-skates, skateboards and the like beyond power provided by the user.

A fourth object is to provide an alternative method of transportation.

These objects and others which will become clear to one skilled in the art may be accomplished by the present invention, which relates to a portable sail which need not be mounted to a boat or the like, as discussed below with reference to the drawings. The portable sail comprises a forward spar and a rear spar, said spars being attached near one end by a lower handle; and a sail material extending between the spars and connected to each of said spars.

DETAILED DESCRIPTION

The invention provides an easily carried and set sail for use on land for recreation and energy efficient propulsion and for use at sea by operators of small boats for recreation or emergency propulsion. The device is portable from one application to another since no mounting in or on the vessel or skate or skateboard is required. On land, the portable sail can be used in combination with, for example, roller skates, in-line skates, skateboards, and the like. The PERSONAL SAIL™ can also be used in combination with ice-skates, skis and the like for winter use.

The PERSONAL SAIL™ sets from its furled position in a matter of seconds and is as easily furled. The spars may be made to be collapsible for more compact storage if required.

Figure 1A:
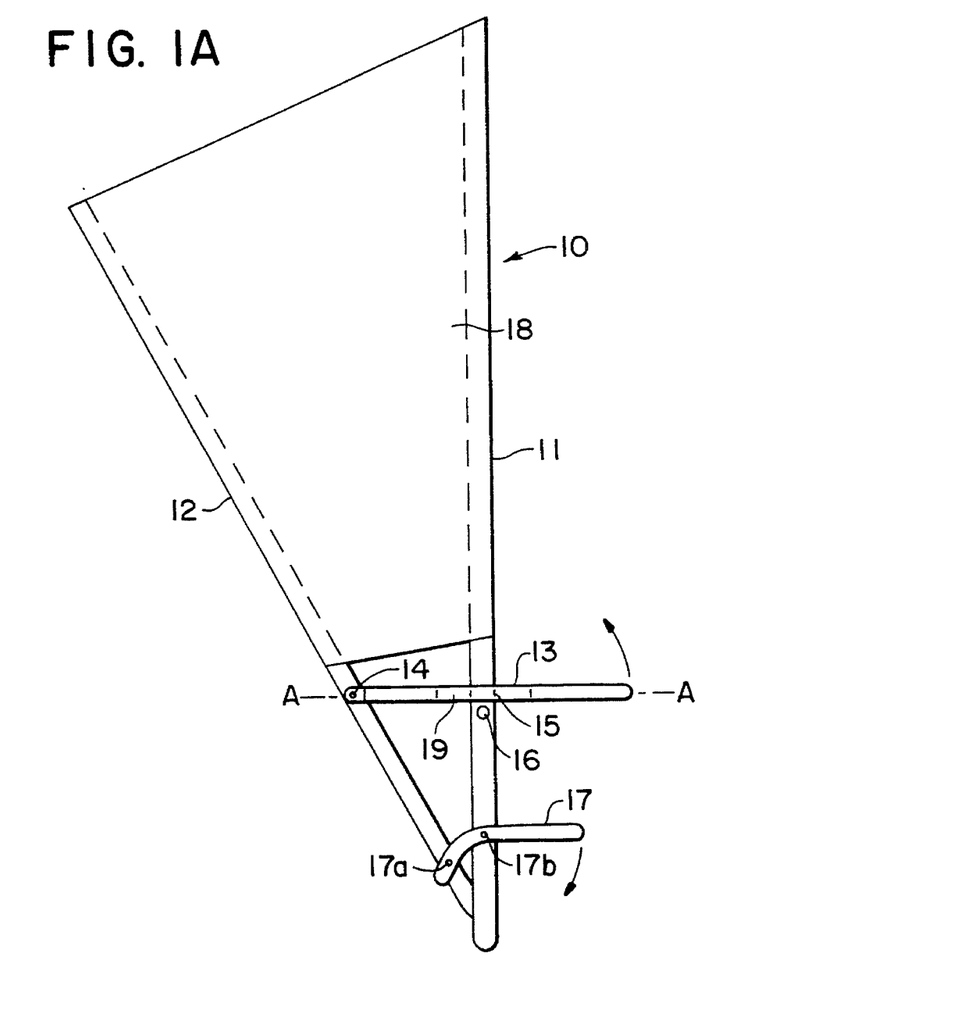
FIG. 1A is a side view of one embodiment of the portable sail of the present invention.
Figure 1B:
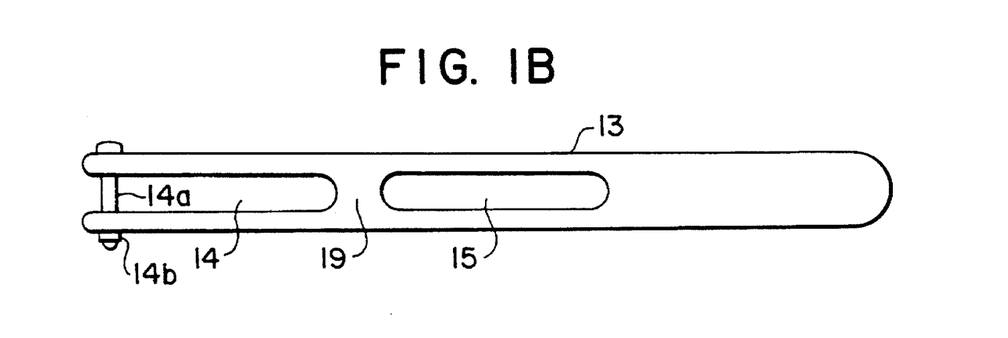
FIG. 1B is taken along the A—A line of FIG. 1A and is a top view of the pivoting and slotted tensioning control handle thereof.

FIG. 1A illustrates one embodiment of the present invention in which the portable sail is generally referred to by the numeral 10. The portable sail 10 comprises two spars, a forward spar 11 and a rear spar 12, which are connected to each other near one end of each spar 11, 12 by a lower handle 17. The distal ends of the spars 11, 12 are connected through a sail material, discussed below. The spars are made of any conventional material known for use thereas, including wood, plastics, composites, metals and the like. On the same half of the spars 11, 12 as the lower handle 17 but closer to the midpoint of the spars 11, 12 is a tensioning control handle 13. A sail material 18 is present in the space defined by the spars 11, 12. The sail material is of generally triangular or truncated triangular shape and can be bordered by, for example, the tensioning control handle 13, the lower handle 17 or the intersection point of the spars 11, 12. The sail material 18 may, but does not have to, extend beyond the distal ends of the spars 11, 12 and the edge thereof can be of a generally linear or arcuate shape. The sail material 18 can be made of any conventional flexible sail material, such as canvas, Dacron™, nylon, silk and the like. The tensioning control handle 13 is shown in more detail in FIG. 1B. The tensioning control handle 13 comprises a forward spar slot 15 and a rear spar slot 14, into which the forward spar 11 and rear spar 12, respectively, fit. The rear spar slot 14 is at one end of the tensioning control handle 13 and is closed at one end by a pivot bolt 14a and nut 14b. The forward spar slot 15 is positioned along the length of the tensioning control handle 13 at a position allowing for maximum tension of the sail material 18 when the sail 10 is in use. The tensioning control handle 13 is for furling and limiting the curvature (sag) in the sail material 18. The curvature is loose for light air and tight (less curvature) for heavy air. The surface area of the sail material 18 remains constant; only the tension is varied. In use, the tensioning control handle 13 pivots downward from the furled position, spreading the sail material 18 and allowing instant variation of tension to match the wind conditions. When the sail 10 is not in use, the tensioning control handle 13 allows the spars 11 and 12 to come into close proximity to each other, folding the entire sail material 18 between them. The sail material 18 can then be bundled or wrapped around the spars 11 and 12. To set the sail 10, the tensioning control handle 13 is pulled out and downward, in a direction opposite that shown in FIG. 1A. A block 19 within the tensioning control handle 13, between the spars 11 and 12, forces the spars 11 and 12 apart. The tensioning control handle 13 provides power to tension the sail 18 in use. Limiting blocks 16, mounted to forward spar 11, prevent the tensioning control handle 13 from traveling too far downward.

Figure 2:
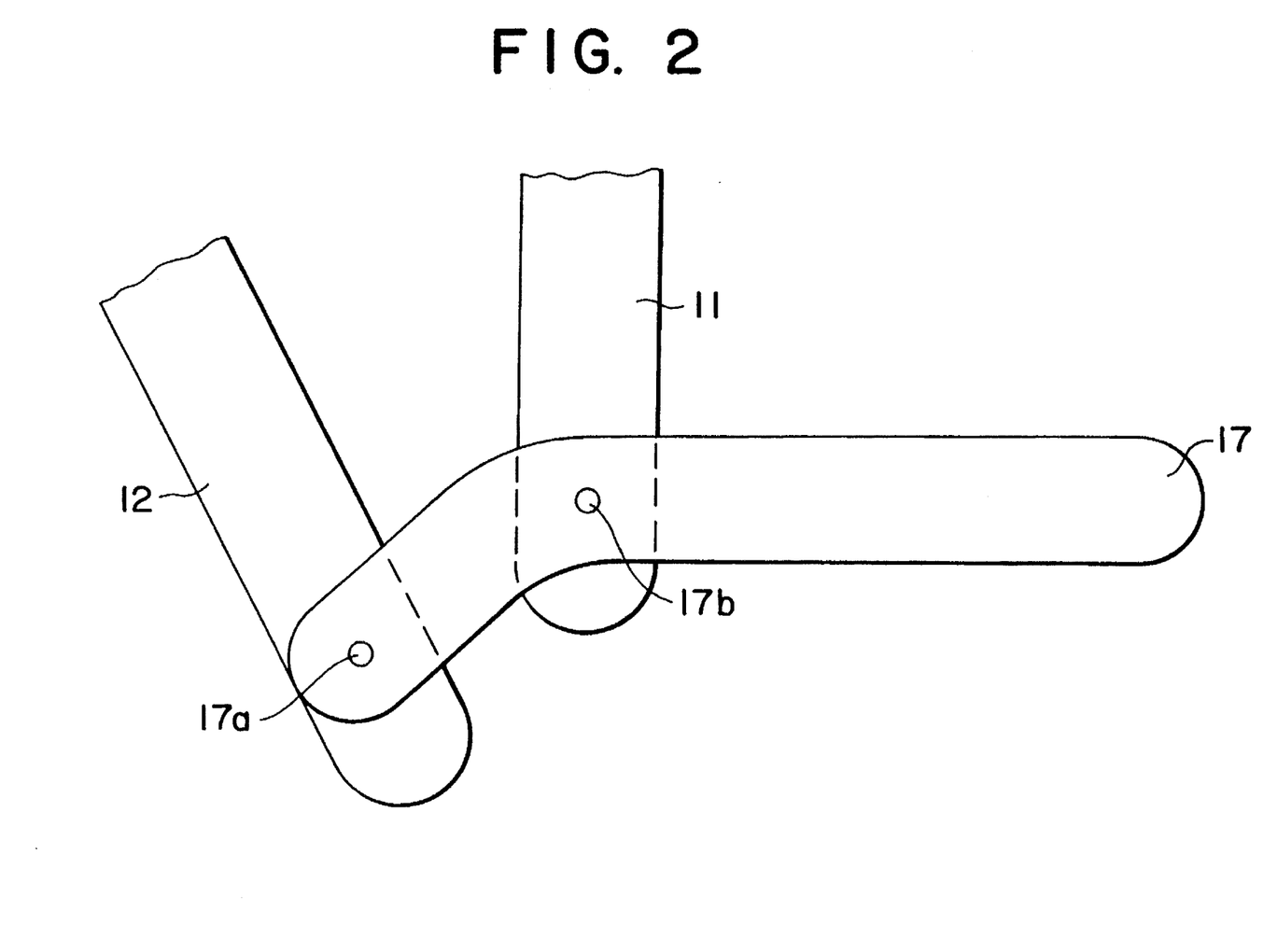
FIG. 2 is a side enlarged view of the lower handle of the sail of FIG. 1A.

Lower handle 17 is shown in greater detail in FIG. 2 and is attached near the end of the spars 11 and 12 by attachment means 17a and 17b. The attachment means can be any such means known in the art and do not form part of the present invention.

Figure 3:
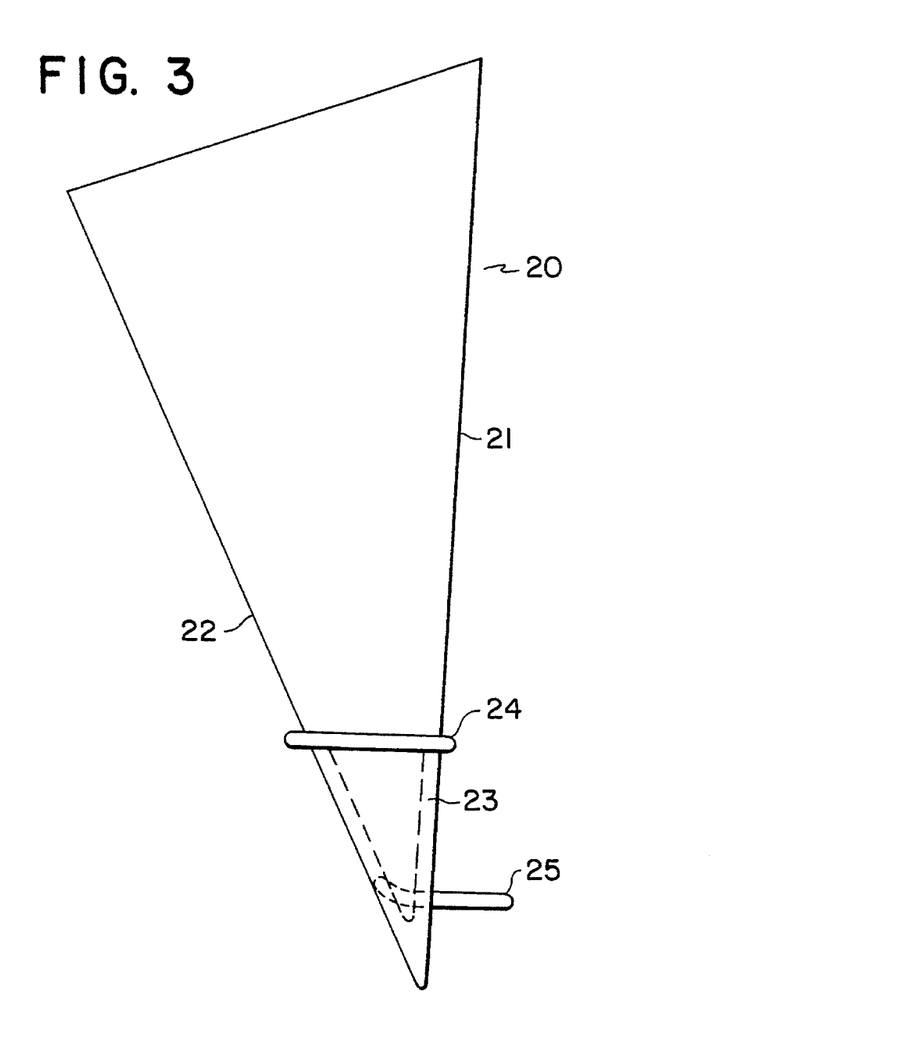
FIG. 3 is a side view of a second embodiment of the portable sail of the present invention including a holster for the sail.
Figure 4A:
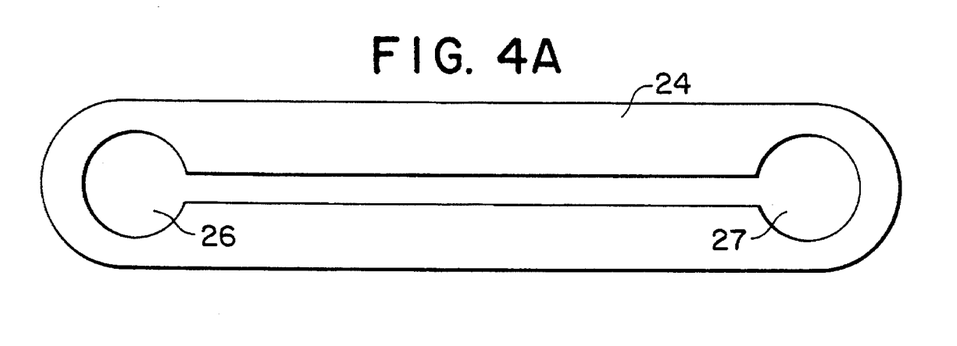
FIG. 4A is an enlarged top view of the holster of the sail of FIG. 3.
Figure 4B:
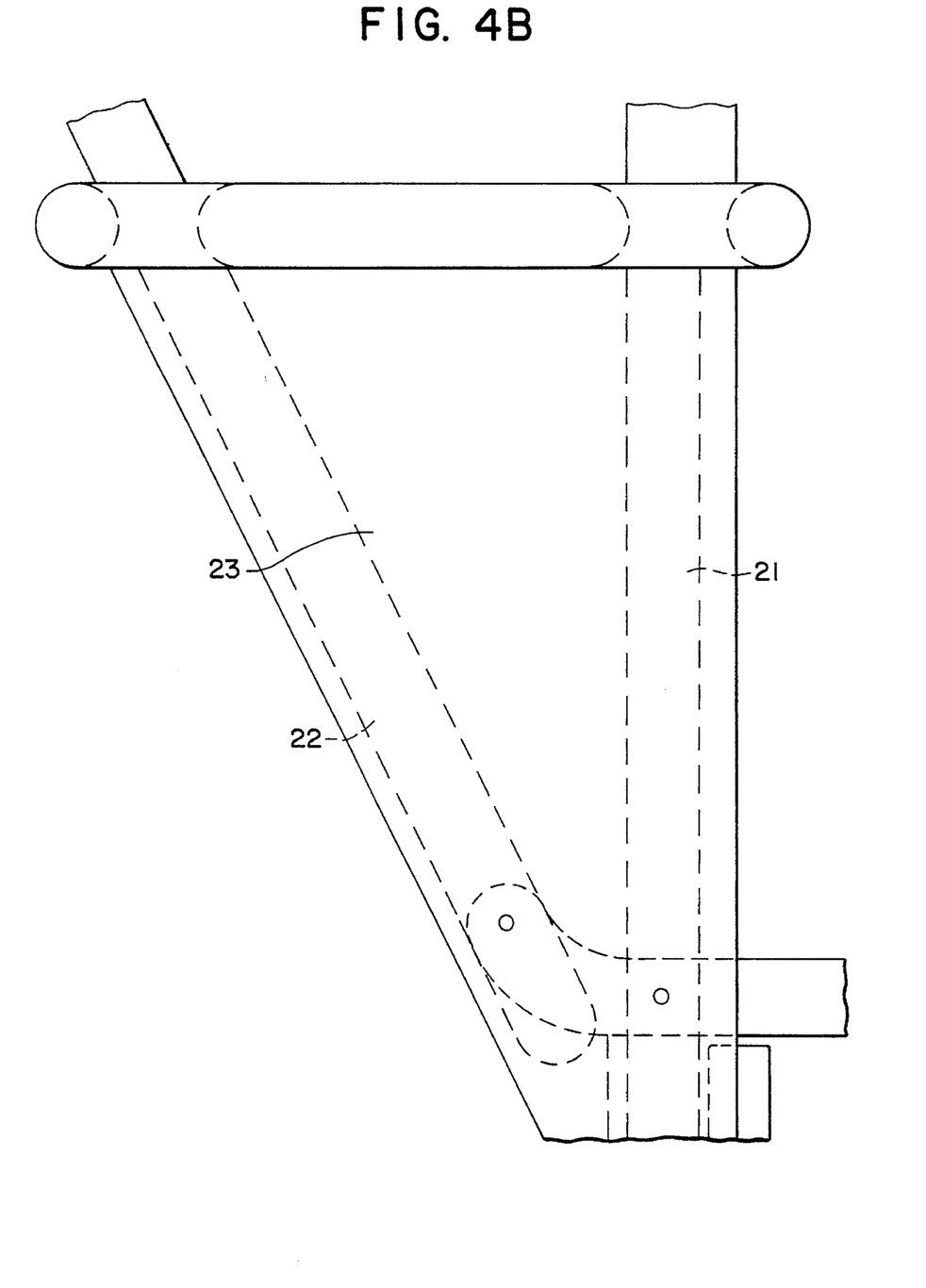
FIG. 4B is an enlarged side view of the holster of the sail of FIG. 3.

FIG. 3 illustrates a second embodiment of the present invention, in which the portable sail is referred to generally by reference numeral 20. Sail 20 comprises a forward spar 21 and a rear spar 22, similar to spars 11 and 12 of the first embodiment. The forward spar 21 and rear spar 22 are attached by a lower handle 25 in a manner similar to the arrangement of the spars 11 and 12 and the lower handle 17 of the portable sail shown in FIG. 1. A holster 23 is provided, which fits over the ends of the spars 21 and 22 for housing and carrying the sail 20. The lower handle 25 pivots out through the front of the holster 23, pressing against the base of the holster 23 causing the spars 21 and 22 to rise as the control handle 25 is lowered. As the spars 21 and 22 rise they move further apart at their upper portions due to the retaining holes 26 and 27 (FIG. 4A) at the top of the holster 23. The lower handle 25 also provides leverage to assist in maintaining the best angle to the wind. An adjustment 28 is used to adjust the lower handle 25. In use, the holster with the portable sail extending above is carried against the chest and shoulder on the leeward side of the body.

Figure 5A:
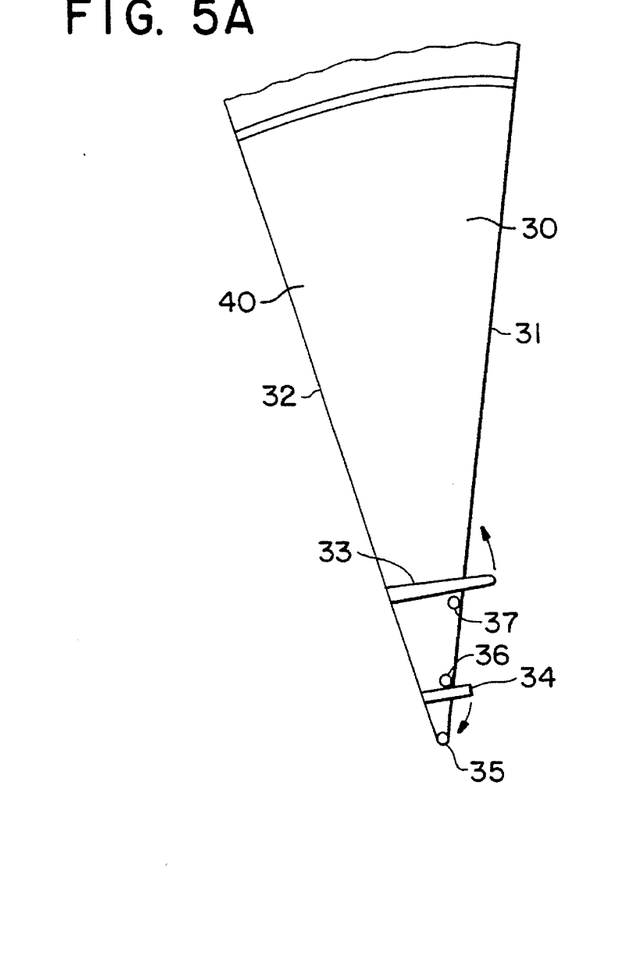
FIG. 5A is a side view of a third embodiment of the portable sail of the present invention.
Figure 5B:
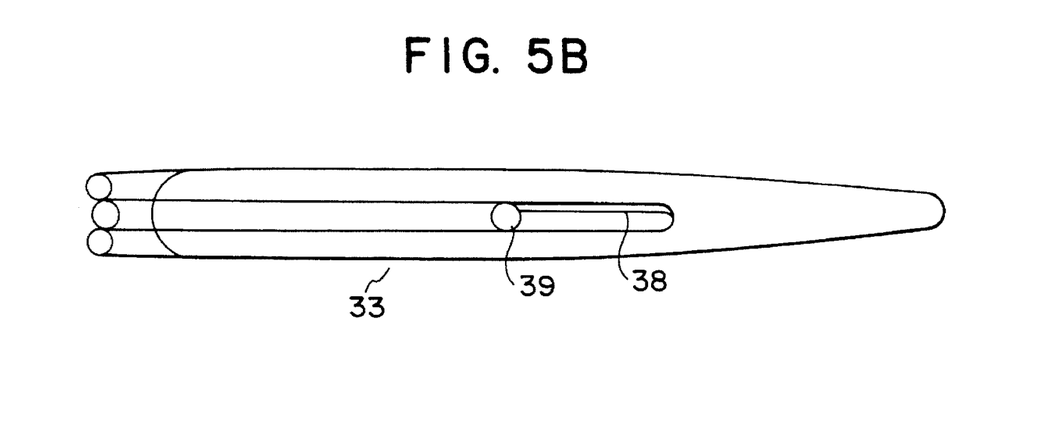
FIG. 5B is an enlarged view of the handles of the portable sail of FIG. 5A.

FIG. 5A illustrates a third embodiment of the present invention, in which the portable sail is referred to generally by reference numeral 30. Sail 30 comprises a forward spar 31 and a rear spar 32, similar to spars 11 and 12 of the first embodiment and spars 21 and 22 of the second embodiment. The forward spar 31 and rear spar 32 are attached by a lower handle 34 in a manner similar to the arrangement in the first and second embodiments. A tensioning control handle 33 is present and is attached in a similar manner as the tensioning control handle 13 of the first embodiment. The portable sail of this embodiment differs from the portable sail of the first and second embodiments in that a cable 38 (see FIG. 5B) pulls apart the spars 31 and 32 to increase the tension on the sail material 40, and the lower handle 34 has the same structure as the tensioning control handle 33 but is smaller in size. The structure of the tensioning control handle 33 is shown in FIG. 5B, in which 38 is the cable and 39 is the cable holder. The lower handle 34 is a slotted miniature of the upper handle 33 but lacks the cable 38 and the cable holder 39. Stop blocks 35, 36 and 37 are provided to prevent the handles 33 and 34, which pivot in the direction indicated by the arrows, from pivoting too far.

Although three apparently distinct embodiments have been discussed, it will be clear to one skilled in the art that portions of the three embodiments are interchangeable. For example, the upper handle from the first embodiment can be used with the lower handle of the third embodiment, and the resulting portable sail would still be part of the present invention.

The size of the portable sail will vary based on the size and strength of the user. The portable sail will be of a size, however, at which it can be easily handled by an individual without the sail being mounted to a boat or the like. The determination of optimal sizes for the portable sail will be clear to those of ordinary skill in the art.

In use, the PERSONAL SAIL™ need not be mounted to a water vessel or the like. That is, the portable sail can be hand held by the user and is of a size and shape which allows it to be manipulated by a human using it.

On water, the present invention can be used as an emergency power source by motor boaters and the like, for use in case the motor unexpectedly stops running due to, for example, mechanical problems or running out of fuel. When needed, the portable sail, which need not be mounted to the vessel, can be utilized and opened very quickly to allow the boater to harness the power of the wind to move the vessel in the direction of safety. No fossil fuels are used in the operation of the PERSONAL SAIL™. Thus, the portable sail is a pollution-free power source.

On land, the present invention can be used for skateboarding, in-line skating, roller skating, ice-skating and the like. The user of the portable sail holds the sail, shifting the direction thereof based on wind conditions and the direction in which travel is desired. For example, when the portable sail is used in skating, tacking is done by skating into the wind and shifting the sail to the other shoulder.

Examples

Figure 6:
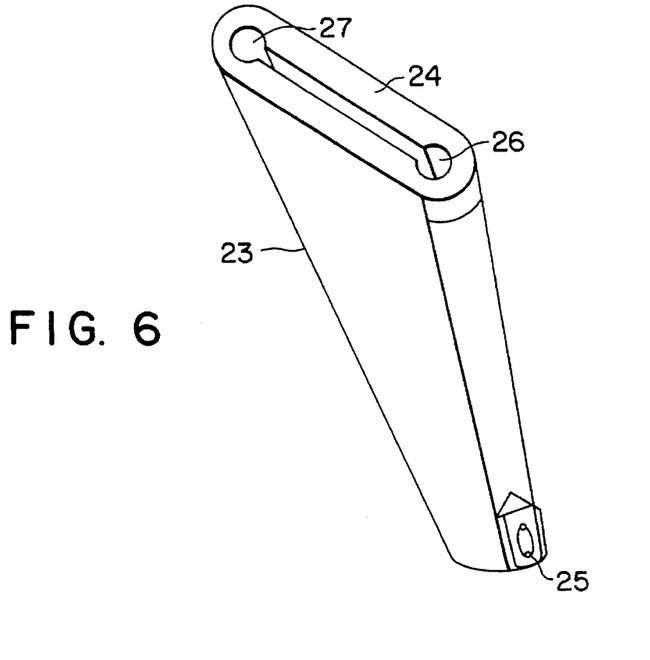
FIG. 6 is a perspective view of a holster of the portable sail of FIG. 3.

FIG. 6 shows an example of the holster 23 of the second embodiment of the present invention. This holster is made of wood reinforced with fiberglass. Additional materials which can be used to form the holster will be clear to those skilled in the art. An adjustable aluminum press plate 25 is present. The upper end 24 of the holster 23 is about 10½ inches long and about 2½ inches wide. The distance between the midpoints of the retaining holes 26 and 27 is about 8 inches. The diameter of the retaining holes 26 and 27 is about 1⅜ inches.

Figure 7:
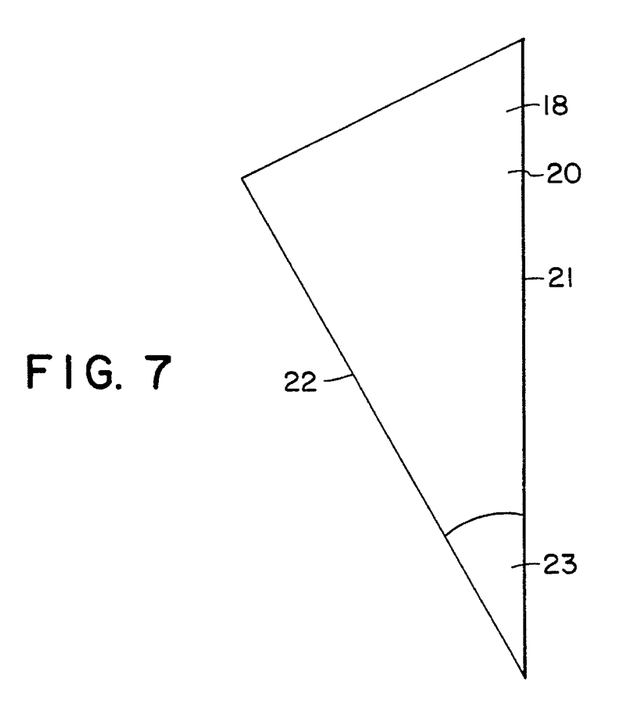
FIG. 7 is a front view of an portable sail of the present invention.

FIG. 7 shows a sail which can be used with the holster 23 of FIG. 6. In this sail, the forward spar 21 is a 1⅛ inch aluminum tube which is about 97 inches long and the rear spar 22 is a 1 inch aluminum tube which is about 85 inches long. The distance between the top 24 of the holster 23 and the far end of the forward spar is about 76 inches. The distance between the top 24 of the holster 23 and the far end of the rear spar is about 69 inches. This sail can also used in the first and third embodiments of the present invention.

Figure 8:
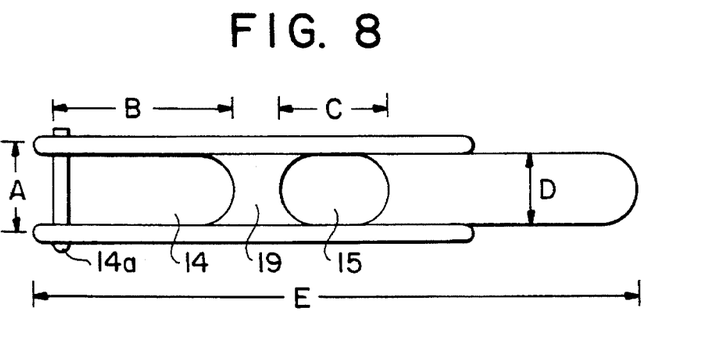
FIG. 8 is a top view of the tensioning control handle of a portable sail of FIG. 1.
Figure 9:
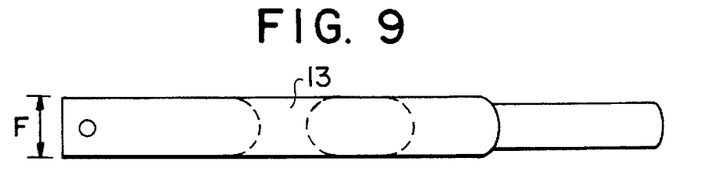
FIG. 9 is a side view of the handle of FIG. 8.

FIG. 8 shows a tensioning control handle of first embodiment of the present invention. The distance A in FIG. 8 is about 2¼ inches. The distance B is about 5 inches. The distance C is about 3 inches. The distance D is about 1¼ inches. The distance E is about 17 inches. The distance F in FIG. 9 is about 1 inch.

Figure 10:
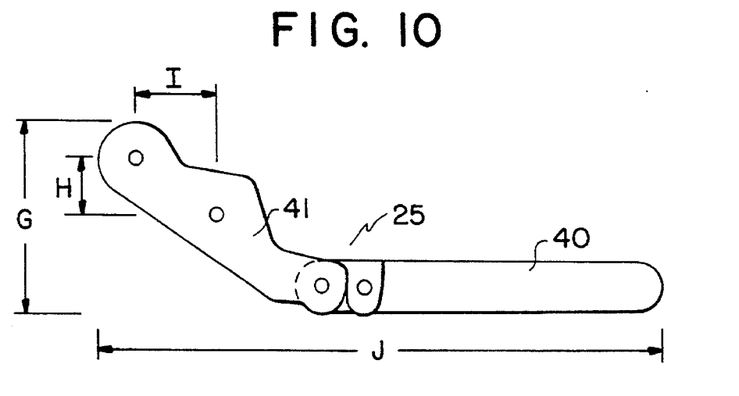
FIG. 10 is a side view of a lower handle which can be used in the portable sail of any of FIGS. 1A, 3 and 5A.
Figure 11:
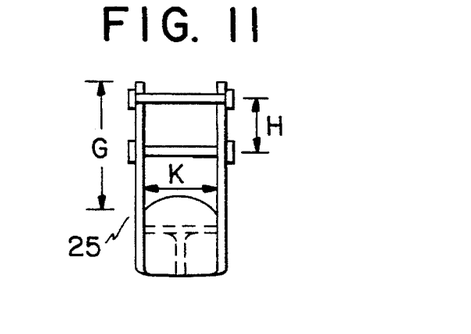
FIG. 11 is an end view of the handle of FIG. 10.

FIG. 10 shows a lower handle which can be used in the first and second embodiment of the present invention. The reference numerals in FIG. 10 are those of the second embodiment. If this handle is used in the first embodiment, it will be turned upside down. The holding portion 40 of the handle is made of oak. The remaining portion 41 of the handle is aluminum cheeks. The oak handle is attached to the aluminum cheeks with wood screws. The distance G is about 3 inches. The distance H is about 1 inch. The distance I is about 1½ inches. The distance J is about 9½ inches. FIG. 11 is a side view of the handle of FIG. 10. Distance K is about 1⅛ inches.

While the above discusses specific embodiments of the present invention, the present invention is in no way limited to these specific embodiments.

What is claimed:

1. A hand held portable sail comprising:

a forward spar and a rear spar, a lower handle indirectly connecting said forward spar to said rear spar;

a tensioning control handle mounted on said rear spar intermediate ends thereof and defining a forward spar slot and a rear spar slot, said forward spar sliding within the forward spar slot; and a sail material extending between the spars and connected to each of said spars, said sail material being bordered by the tensioning control handle.

2. The portable sail of claim 1 further comprising a holster which fits over the ends of the spars near the lower handle, which houses a portion of the spars and lower handle.

3. The portable sail of claim 1 wherein the sail material is of generally triangular or truncated triangular shape.

4. The portable sail of claim 1, including a limiting block mounted on the forward spar to limit the downward movement of the tensioning control handle.

5. The portable sail of claim 1, including a limiting block mounted on the forward spar to limit the upward movement of the lower handle.

6. A hand held portable sail comprising:

a forward spar and a rear spar, a lower handle indirectly connecting said forward spar to said rear spar;

a tensioning control handle defining a forward spar slot and a rear spar slot, the forward and rear spars, respectively, sliding mounted within the forward and rear spar slots; and a sail material extending between the spars and connected to each of said spars, said sail material being bordered by the lower handle.

7. The portable sail of claim 6 wherein the sail material is of generally triangular or truncated triangular shape.

8. The portable sail of claim 6, including a limiting block mounted on the forward spar to limit the downward movement of the tensioning control handle.

9. The portable sail of claim 6, including a limiting block mounted on the forward spar to limit the upward movement of the lower handle.

* * * * *